United States Patent
Beaudeau

(10) Patent No.: US 11,025,358 B1
(45) Date of Patent: Jun. 1, 2021

(54) METHOD OF ADAPTIVELY MITIGATING COMMON TEMPLATE MULTI-CHANNEL WIRELESS INTERFERENCE

(71) Applicant: BAE SYSTEMS Information and Electronic Systems Integration Inc., Nashua, NH (US)

(72) Inventor: Jonathan P. Beaudeau, Littleton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/852,631

(22) Filed: Apr. 20, 2020

(51) Int. Cl.
*H04J 11/00* (2006.01)
*H04B 1/713* (2011.01)
*H04B 1/12* (2006.01)
*H04B 1/10* (2006.01)
*H04B 1/525* (2015.01)
*H04B 1/28* (2006.01)

(52) U.S. Cl.
CPC ........ *H04J 11/0036* (2013.01); *H04B 1/1036* (2013.01); *H04B 1/123* (2013.01); *H04B 1/28* (2013.01); *H04B 1/525* (2013.01); *H04B 1/713* (2013.01)

(58) Field of Classification Search
CPC .. H04B 1/713; H04B 7/15; H04B 2001/7152; H04B 1/10; H04B 1/1027; H04B 1/1036; H04B 1/12; H04B 1/123; H04B 1/715; H04J 11/0036
See application file for complete search history.

(56) References Cited

U.S. PATENT DOCUMENTS

| | | | |
|---|---|---|---|
| 5,259,030 A | 11/1993 | Francis | |
| 5,796,779 A * | 8/1998 | Nussbaum | H04B 7/0854 375/267 |
| 5,859,870 A | 1/1999 | Tsujimoto | |
| 7,346,134 B2 * | 3/2008 | Smith | H04B 1/123 375/346 |
| 7,936,851 B2 | 5/2011 | Renfors | |

(Continued)

OTHER PUBLICATIONS

Office Action for U.S. Appl. No. 16/852,750, dated Nov. 25, 2020, 17 Pages.

*Primary Examiner* — Betsy Deppe
(74) *Attorney, Agent, or Firm* — Maine Cernota & Rardin; Scott J. Asmus

(57) ABSTRACT

A method of mitigating interference in a wireless signal of interest (SOI) received on an active frequency channel due to a common template multi-channel jamming attack includes selecting at least one reference channel from among a plurality of monitored frequency channels in which correlated jamming patterns are present without the SOI. The method further includes generating a plurality of weights according to data obtained from the active and reference channels, and applying an adaptive digital filter to the active channel according to the generated weights. The monitored frequency channels can be centered about the active frequency channel. The selection of reference channels can be varied and optimized. The data from each reference channel can be used to create a single virtual antenna tap or a plurality thereof. Assignment of the active channel can be time-varied to match a hopping pattern of a frequency hopping SOI.

22 Claims, 5 Drawing Sheets

(56) References Cited

U.S. PATENT DOCUMENTS

| | | | |
|---|---|---|---|
| 7,957,496 B2* | 6/2011 | Loiseau | H04L 27/1525 |
| | | | 375/350 |
| 8,160,119 B2* | 4/2012 | Chevalier | H04B 1/715 |
| | | | 375/132 |
| 8,204,164 B1 | 6/2012 | Furman | |
| 9,344,125 B2* | 5/2016 | Kpodzo | H04B 17/318 |
| 9,947,337 B1 | 4/2018 | Wang | |
| 10,651,891 B1 | 5/2020 | Gardiner | |
| 2001/0054974 A1 | 12/2001 | Wright | |
| 2003/0007553 A1 | 1/2003 | Fifield | |
| 2004/0081248 A1 | 4/2004 | Parolari | |
| 2006/0035593 A1 | 2/2006 | Leeds | |
| 2006/0244528 A1 | 11/2006 | Pickerd | |
| 2009/0202024 A1 | 8/2009 | Inoue | |
| 2010/0183048 A1 | 7/2010 | Hamamura | |
| 2010/0289688 A1 | 11/2010 | Sherman | |
| 2011/0305306 A1 | 12/2011 | Hu | |
| 2019/0363819 A1 | 11/2019 | Cooper | |

* cited by examiner

METHOD OF ADAPTIVELY MITIGATING COMMON TEMPLATE MULTI-CHANNEL WIRELESS INTERFERENCE

STATEMENT OF GOVERNMENT INTEREST

The invention claimed in this patent application was made with U.S. Government support under a Classified contract no. awarded by a Classified Agency. The U.S. Government has certain rights in the invention.

FIELD

The disclosure relates to apparatus and methods of interference mitigation in wireless communications, and more particularly to methods that implement adaptive filters for interference mitigation.

BACKGROUND

Wireless communications, including message communications as well as GPS and other communications, can be subject to malicious "jamming" signals that are broadcast by an antagonist. In the simplest case, if a message or other "signal of interest" (SOI) is being broadcast within an "active" frequency band or "channel," an interferer may attempt to overwhelm the SOI by broadcasting a jamming signal in the same active frequency channel. The jamming signal can be of any type, including simple Gaussian "white" noise.

One approach to avoiding such interference is to transmit the SOI on a different wireless frequency channel that is not being blocked. However, at any given time there may be many signals of interest transmitted simultaneously on a plurality of frequency channels, making it hard for all of them to avoid jamming signals.

Furthermore, an antagonist may attempt to block multiple frequency channels by transmitting jamming signals simultaneously on all of the channels. Often, the "interference pattern" of the jamming signal is the same or similar on each of the jammed channels. For example, correlated interference patterns can be transmitted by the antagonist on all of the jammed channels according to a jamming "template," where the template can be simple Gaussian "white noise" or any other interference pattern. Any sort of interference wherein correlated interference patterns are transmitted simultaneously on a plurality of frequency channels is referred to herein as "common template multi-channel" interference, or "CTMC" interference.

In some cases, a signal of interest may be transmitted using Frequency Hopping Spread Spectrum (FHSS) communication. In FHSS communication, messages are transmitted in a series of pulses or timeslots that hop among a plurality of FHSS frequency channels in a pseudo-random pattern that can only be anticipated by an intended receiver who is in possession of a designated hopping pattern decryption key. This approach can render interception of the transmitted information more difficult, but the frequency hopping of FHSS can make it more likely that at least one of the FHSS frequency channels will be jammed.

One approach that can be a powerful tool for mitigating interference in wireless communications is to implement an adaptive digital filter in the receiver. Adaptive digital filters are a class of digital filters that iteratively alter their parameters to minimize the mean squared error between the filter output and a desired signal. The most common adaptive filter algorithms are the Least Mean Square (LMS) algorithm and the Recursive Least Square (RLS) algorithm, where the RLS algorithm offers a higher convergence speed compared to the LMS algorithm, but at the cost of higher computational complexity.

With reference to FIG. 1A, in a typical wireless receiver an Analog to Digital Converter (ADC) 20 receives a wireless signal from an analog front end (including e.g. an antenna, low-noise amplifier, filters, mixers, etc) 15 and converts the analog signal into a digital received signal 65, after which a Digital Down Converter (DDC) 10 removes the carrier frequency from the digitized signal 65 to provide a down-converted data stream 45.

In receivers that implement an adaptive digital filter 5, also referred to herein as an interference "mitigator" 5, the down-converted digitized data stream 45 is directed to a "weight generator" 25 that iteratively calculates an optimal set of "weights" 30 that control the digital filtering. The weights 30 are then directed to a "scrubber" 40 that uses the weights to generate an "intermediate" signal that is maximally correlated with the interference while being minimally correlated with the SOI. The scrubber 40 then applies the resulting filter function to the down-converted digitized data stream 70 received from the DDC 10, which may be time-delayed by a delay module 60 so as to compensate for the time that is required for the weight generator 25 to calculate the weights 30. Essentially, the scrubber 40 subtracts the intermediate signal, which approximates the jamming signal, from the down-converted data stream 70, so that the resulting, filtered output signal 50 is a close approximation to the signal of interest in which the interference energy is significantly suppressed relative to the SOI energy.

The filtered output 50 is fed back 55 to the weight generator 25 to provide filtering feedback, so that the weights 30 can be iteratively adjusted until they converge on an optimal solution. The adaptive filter 5 thereby uses filtering feedback 55 in the form of an error signal to refine its weights 30, and thereby its transfer function. In general, this adaptive process involves the use of a "cost" function that is a criterion for improving the efficiency of the filter, to satisfy an algorithm. Also, the cost function determines how to adapt the filter transfer function to reduce the cost on the next iteration. The mean square of the of the error portion of the filtered signal 50 is often used as the cost function. The weights 30 of the adaptive filter 5 are adjusted by the weight generator 25 until the error, i.e. the cost, is minimized. Accordingly, there are at least two input signals 45, 55 to the weight generator 25 that are referred to herein as the primary 45 and the filtering feedback 55 input, respectively.

Depending on the specific implementation, any of several approaches can be used to determine the error or cost associated with a given set of adaptive digital filter weights, so that appropriate feedback 55 can be provided to the weight generator 25. For example, self-correction features such as checksums included in the signal of interest can be used to determine residual error rates of the filtered signal 50.

With reference to FIG. 1B, adaptive filters can be simultaneously applied to a plurality of frequencies F1, F2, F3, etc., for example when applied to FHSS communication, or in an environment where a plurality of signals of interest (SOI's) are being transmitted simultaneously on a plurality of frequency channels.

While adaptive digital filters can be effective in mitigating CTMC jamming of a signal of interest, nevertheless adaptive digital filters are required to calculate weights based on limited data, and may be only partly effective in mitigating the effects of jamming.

What is needed, therefore, is an improved method of applying adaptive digital filtering to a received signal or signals in the presence of common template multi-channel (CTMC) interference.

SUMMARY

The present disclosure is an improved method of applying adaptive digital filtering to a received signal or signals containing a signal of interest (SOI) in the presence of common template multi-channel (CTMC) interference. It is assumed that the CTMC interference comprises the simultaneous transmission of correlated interference patterns on a plurality of CTMC frequency channels according to similar or identical jamming signal patterns or "templates." The CTMC frequency channels are defined by the CTMC interference pattern bandwidth and by the center frequencies of the CTMC interference pattern transmissions. In embodiments, the interference patterns may be nominally identical, whereby a baseband "template" interference pattern is frequency shifted into the various CTMC frequency channels, which can be at regular frequency intervals. The interference pattern can be any pattern, including Gaussian noise, so long as there is no significant overlap of the interference patterns when transmitted in adjacent CTMC frequency channels. It is further assumed that at least during certain time intervals the SOI falls spectrally within one of the CTMC frequency channels, which is referred to herein as the "active" CTMC frequency channel.

According to the present disclosure, in addition to creating an "active" data stream by detecting and digitizing signal on the active CTMC frequency channel that carries the signal of interest (SOI), the present method also includes creating at least one "monitored" data stream by detecting and digitizing signals from at least one other, and in embodiments from a plurality of other, "monitored" CTMC frequency channels in which the SOI is not present. Some or all of the monitored data streams are selected as "reference" data streams, and the jamming pattern data that is recorded in these reference data streams is directed to the weight generator of an adaptive digital filter as "reference" data that is used in combination with data from the active data stream to improve the jamming mitigation.

In embodiments, the reference data is used by the weight generator to generate additional "reference" adaptive filter weights that are provided to the scrubber. The scrubber then multiplies the reference data streams by the reference adaptive filter weights, and subtracts the result from the active data stream that is acquired in the active CTMC frequency channel, thereby enhancing the suppression of the jamming signal in the output data stream. In effect, in some embodiments, each of the reference data streams is used by the weight generator to create a single virtual antenna tap of the adaptive digital filter.

In embodiments, the selection of the reference data streams from among the monitored data streams is varied until an optimal set of reference data streams is identified, i.e. a set of data streams that provides the most successful suppression of the CTMC interference.

The presently disclosed method thereby takes advantage of correlations between the jamming signal patterns that are transmitted in the active and monitored CTMC frequency channels to provide additional data to the adaptive digital filter, and thereby to increase the suppression of the jamming signal and improve the quality of the filtered output in the output data stream.

It should be noted that the term "monitored" CTMC frequency channel is used herein to refer to any CTMC frequency channel that is detected and digitized, in which a jamming signal is present, but the SOI that is being mitigated is not present, at least during the time that jamming pattern data is acquired therefrom. "Selected" or "reference" CTMC frequency channels refers to monitored channels that are selected and provided to the weight generator as reference data, where the reference CTMC channels can be all or a subset of the monitored CTMC channels. The "active" CTMC frequency channel at any given time is the CTMC channel in which the SOI that is being mitigated is present, in addition to a jamming signal. The active CTMC frequency channel is always directed to the weight generator.

In embodiments, the monitored CTMC channels are centered about the active CTMC frequency channel. In some embodiments, the data from each selected CTMC channel provides a single "virtual antenna tap" to the adaptive digital filter, while in other embodiments the data from at least one of the selected CTMC channels provides a plurality of virtual antenna taps to the adaptive filter, for example when multipath echoes are present in the data.

In embodiments, the disclosed receiver further includes a channel selector that selects a subset of "reference" channels from among the monitored channels. The selection can be varied until an optimal set of reference channels is identified.

In some embodiments where the signal of interest (SOI) is transmitted as a frequency hopping spread spectrum (FHSS) transmission, the method of the present disclosure is implemented as described above, except that the designation of the "active" CTMC frequency channel is reassigned among the frequency channels so that it "hops" together with the SOI. In some of these embodiments, after at least one or more of the FHSS channel hops, the channel that was previously the active CTMC frequency channel becomes one of the monitored CTMC frequency channels.

A first general aspect of the present invention is an apparatus configured for mitigating common template multi-channel ("CTMC") interference in a received wireless signal, where the CTMC interference includes a plurality of correlated interference patterns broadcast on a plurality of CTMC frequency channels, a first of said CTMC frequency channels being an active CTMC frequency channel in which a signal of interest ("SOI") is also broadcast, the other of said CTMC frequency channels being characterized by an absence of the SOI. The apparatus includes at least one analog-to-digital converter ("ADC") configured to create a digital input data stream from the received wireless signal, at least one digital down converter ("DDC"s), each of the DDCs being configured to provide a down-converted data stream derived from signal detected on a respective one of the CTMC frequency channels, said down-converted data streams comprising an active data stream in which the SOI is present and at least one monitored data stream in which the SOI is not present, a reference generator configured to select from among the monitored data streams at least one reference data stream, a scrubber, and a weight generator configured to generate an optimized set of adaptive filter weights according to the active data stream and the at least one reference data stream, and according to filtering feedback provided by the scrubber. The scrubber is configured to apply digital filtering to the active data stream according to the optimized set of adaptive filter weights so as to produce an output stream, and to direct updated filtering feedback to the scrubber.

In embodiments the monitored CTMC channels are centered about the active CTMC frequency channel.

In any of the above embodiments, the weight generator can be configured to use each of the reference data streams to create a corresponding single virtual antenna tap.

In any of the above embodiments, the weight generator can be configured to use at least one of the reference data streams to create a plurality of virtual antenna taps.

In any of the above embodiments, the reference generator can be configured to vary the selection of the at least one reference data stream until an optimal set of reference data streams is identified.

In any of the above embodiments, the weight generator can be configured to include a set of reference filter weights as part of the set of adaptive filter weights, and wherein the scrubber is configured, when applying the digital filtering to the active data stream, to multiply each of the reference data streams by at least one corresponding reference filter weight to produce a reference product, accumulate a sum of the reference products, and subtract the sum of reference products from the active data stream.

A second general aspect of the present invention is a computer program product including one or more non-transitory machine-readable mediums having instructions encoded thereon that, when executed by one or more processors, result in a plurality of operations for mitigating common template multi-channel ("CTMC") interference in a received wireless signal, the CTMC interference including a plurality of correlated interference patterns broadcast on a plurality of CTMC frequency channels, a first of said CTMC frequency channels being an active CTMC frequency channel in which a signal of interest ("SOI") is also broadcast, the other of said CTMC frequency channels being characterized by an absence of the SOI. The operations include creating a plurality of data streams from the received wireless signal, each of the data streams being derived from signal detected on a respective one of the CTMC frequency channels, said data streams comprising an active data stream in which the SOI is present and at least one monitored data stream in which the SOI is not present, selecting from among the monitored data streams at least one reference data stream, directing the active data stream and the at least one reference data stream to a weight generator, generating by the weight generator of an optimized set of adaptive filter weights according to the active data stream and the at least one reference data stream, and according to filtering feedback provided by a scrubber, applying by the scrubber of digital filtering to the active data stream according to the optimized set of adaptive filter weights so as to produce an output stream, and directing by the scrubber of updated filtering feedback to the scrubber.

In embodiments, the monitored CTMC channels are centered about the active CTMC frequency channel.

In any of the above embodiments, each of the reference data streams can be used by the weight generator to create a single virtual antenna tap.

In any of the above embodiments, at least one of the reference data streams can be used by the weight generator to create a plurality of virtual antenna taps.

In any of the above embodiments, selecting at least one reference data stream from among the monitored data streams can include varying the selection of the at least one reference data stream until an optimal set of reference data streams is identified.

In any of the above embodiments, generating by the weight generator of an optimized set of adaptive filter weights can include generating by the weight generator of a set of reference filter weights, and wherein applying by the scrubber of digital filtering to the active data stream can include multiplying each of the reference data streams by at least one corresponding reference filter weight to produce a reference product, accumulating a sum of the reference products, and subtracting the sum of reference products from the active data stream.

A third general aspect of the present invention is a method of mitigating common template multi-channel ("CTMC") interference in a received wireless signal, the CTMC interference including a plurality of correlated interference patterns broadcast on a plurality of CTMC frequency channels, a first of said CTMC frequency channels being an active CTMC frequency channel in which a signal of interest ("SOI") is also broadcast, the other of said CTMC frequency channels being characterized by an absence of the SOI. The method includes creating from the received wireless signal a plurality of data streams, each of the data streams being derived from a signal detected on a respective one of the CTMC frequency channels, said data streams comprising an active data stream in which the SOI is present and at least one monitored data stream in which the SOI is not present, selecting from among the monitored data streams at least one reference data stream, directing the active data stream and the at least one reference data stream to a weight generator, causing the weight generator to generate an optimized set of adaptive filter weights according to the active data stream and the at least one reference data stream, and according to filtering feedback provided by a scrubber, causing the scrubber to produce an output stream by applying digital filtering to the active data stream according to the optimized set of adaptive filter weights, and causing the scrubber to direct updated filtering feedback to the weight generator.

In embodiments, the correlated interference patterns are substantially identical to each other.

In any of the above embodiments, the monitored CTMC channels can be centered about the active CTMC frequency channel.

In any of the above embodiments, each of the reference data streams can be used by the weight generator to create a single virtual antenna tap.

In any of the above embodiments, at least one of the reference data streams can be used by the weight generator to create a plurality of virtual antenna taps.

In any of the above embodiments, selecting at least one reference data stream from among the monitored data streams can include varying the selection of the at least one reference data stream until an optimal set of reference data streams is identified.

In any of the above embodiments, the set of adaptive filter weights can include a set of reference filter weights, and applying the digital filtering to the active data stream can include multiplying each of the reference data streams by at least one corresponding reference filter weight to produce a reference product stream, accumulating a sum of the reference product streams, and subtracting the sum of reference product streams from the active data stream.

In any of the above embodiments, the SOI can be transmitted as a frequency hopping spread spectrum ("FHSS") transmission, and the method can include reassigning the active frequency channel among the CTMC frequency channels so that the active CTMC frequency channel always contains the SOI. In some of these embodiments, reassigning the active frequency from a first of the CTMC frequency channels to a second of the CTMC frequency channels includes designating the first of the CTMC frequency channels as one of the monitored CTMC frequency channels. And any of these embodiments, reassigning the active frequency from a first of the CTMC frequency channels to a second of the CTMC frequency channels can include designating the first of the CTMC frequency channels as one of the reference CTMC frequency channels.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is an improved method of applying adaptive digital filtering to a received signal or signals containing a signal of interest (SOI) in the presence of common template multi-channel (CTMC) interference. It is assumed that the CTMC interference comprises the simultaneous transmission of correlated interference patterns, i.e. correlated jamming signals, on a plurality of CTMC frequency channels according to similar or identical jamming signal patterns or "template." The CTMC frequency channels are defined by the CTMC interference pattern bandwidth, and by the center frequencies of the CTMC interference pattern transmissions. In embodiments, the interference patterns may be nominally identical, whereby a baseband "template" interference pattern is frequency shifted into the various CTMC frequency channels, which can be at regular frequency intervals. The interference pattern template can be any pattern, including Gaussian noise, so long as there is no significant overlap of the interference patterns when transmitted in adjacent CTMC frequency channels. It is further assumed that at any given moment the SOI falls spectrally within one of the CTMC frequency channels, which is referred to herein as the "active" CTMC frequency channel.

Figure 1A:
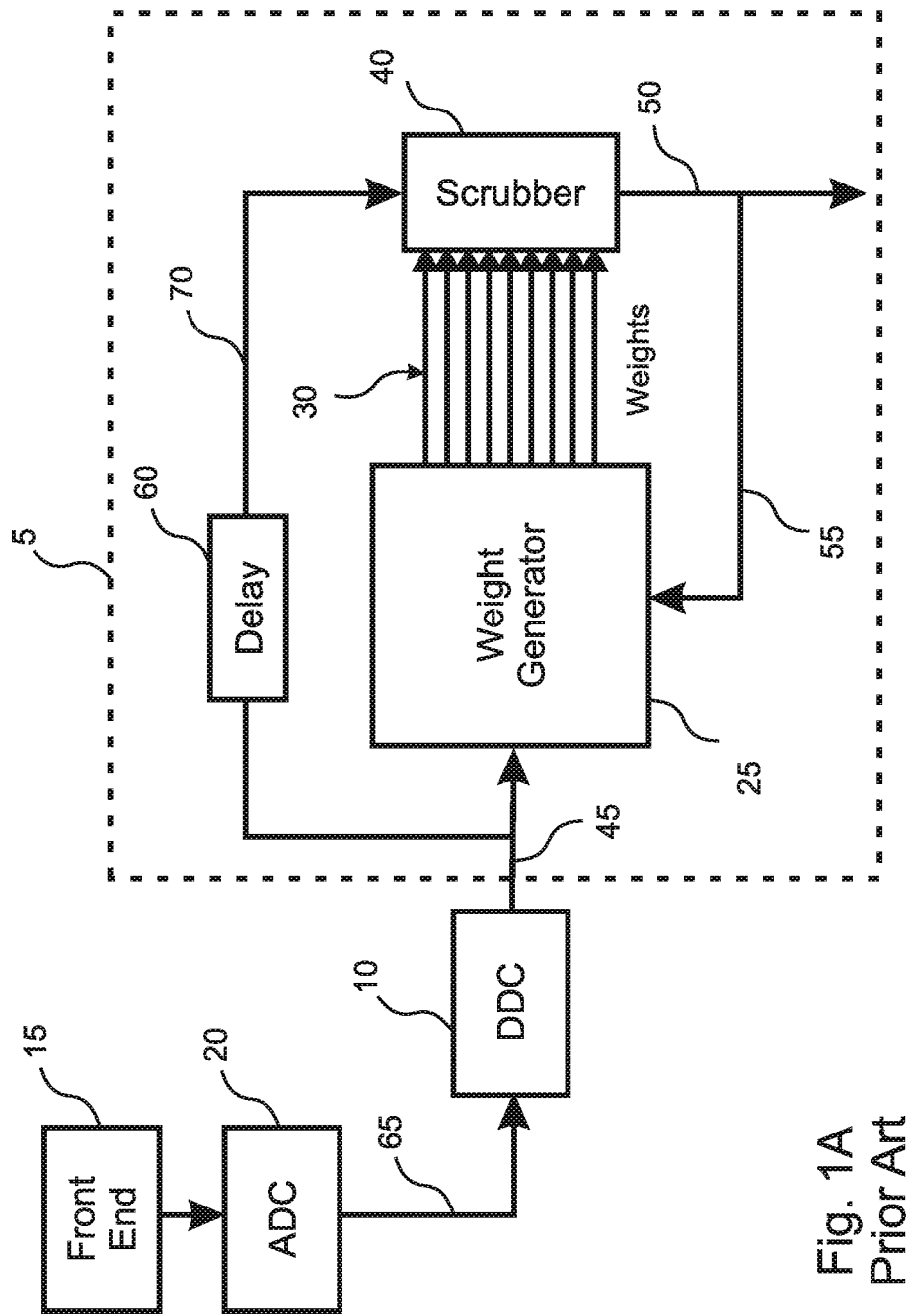
FIG. 1A is a block diagram of an adaptive digital filter of the prior art.
Figure 1B:
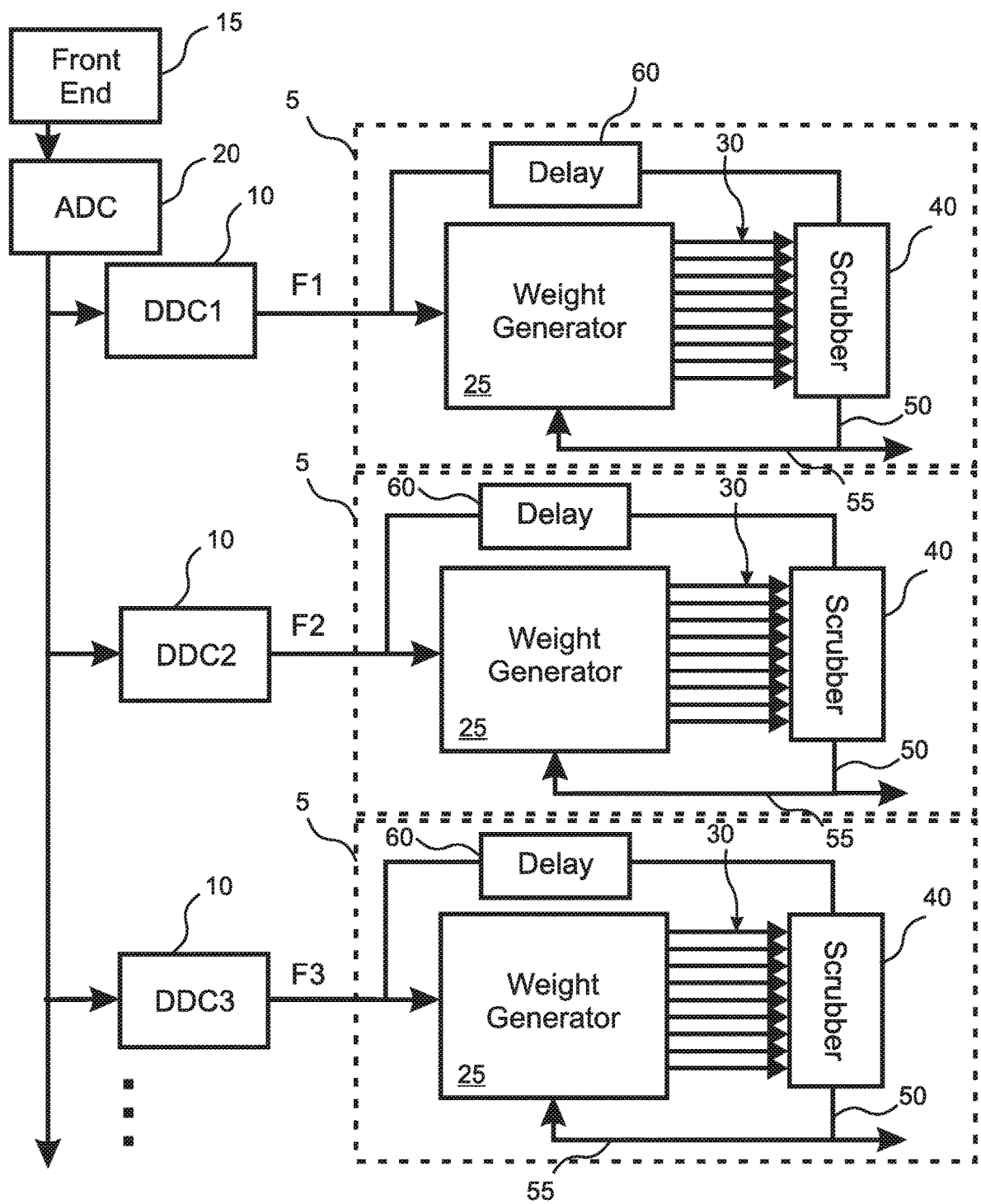
FIG. 1B is a block diagram illustrating a plurality of adaptive digital filters dedicated to a corresponding plurality of receiver frequencies according to the prior art.
Figure 2:
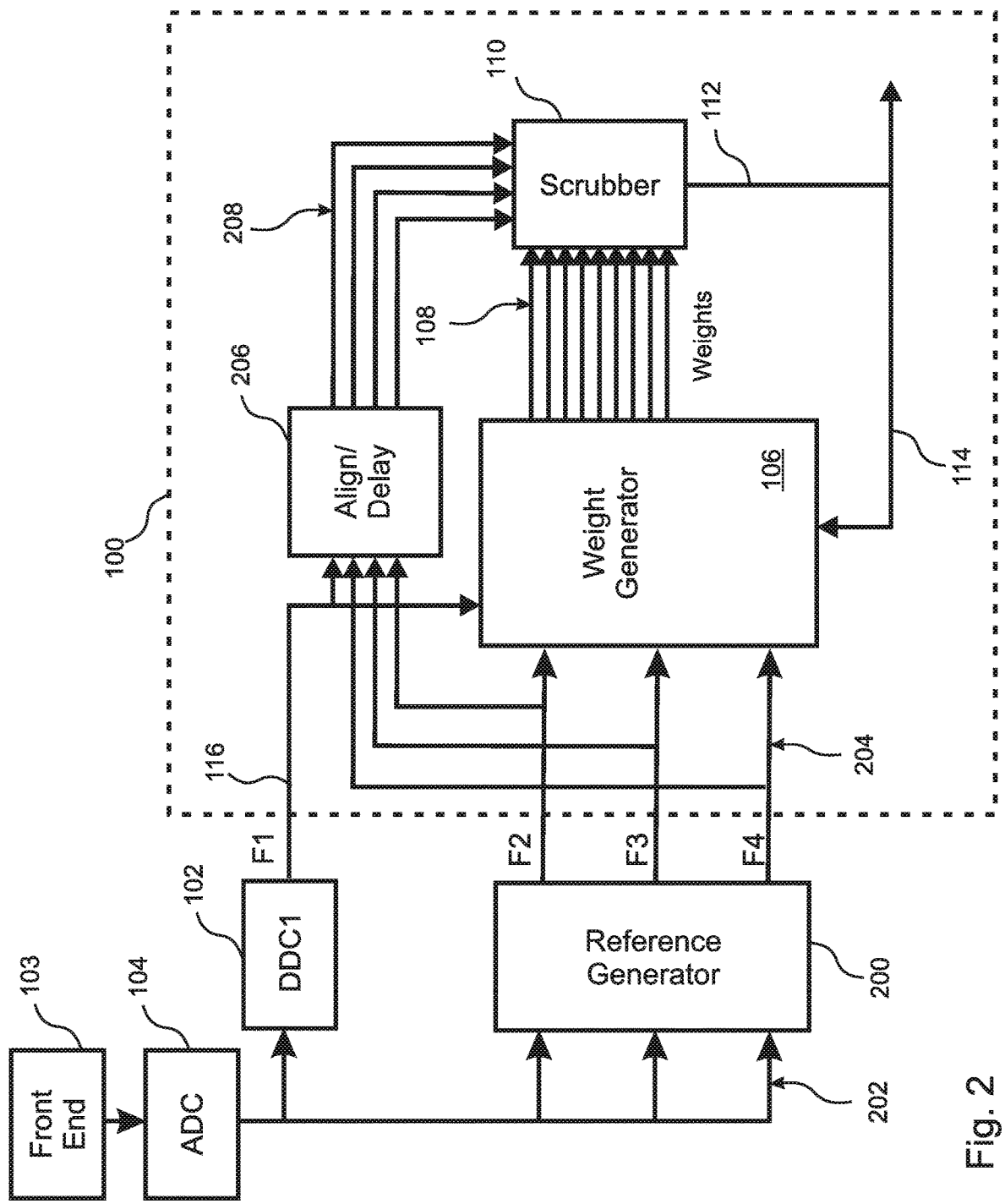
FIG. 2 is a block diagram that illustrates an adaptive digital filter in an embodiment of the present disclosure.
Figure 3:
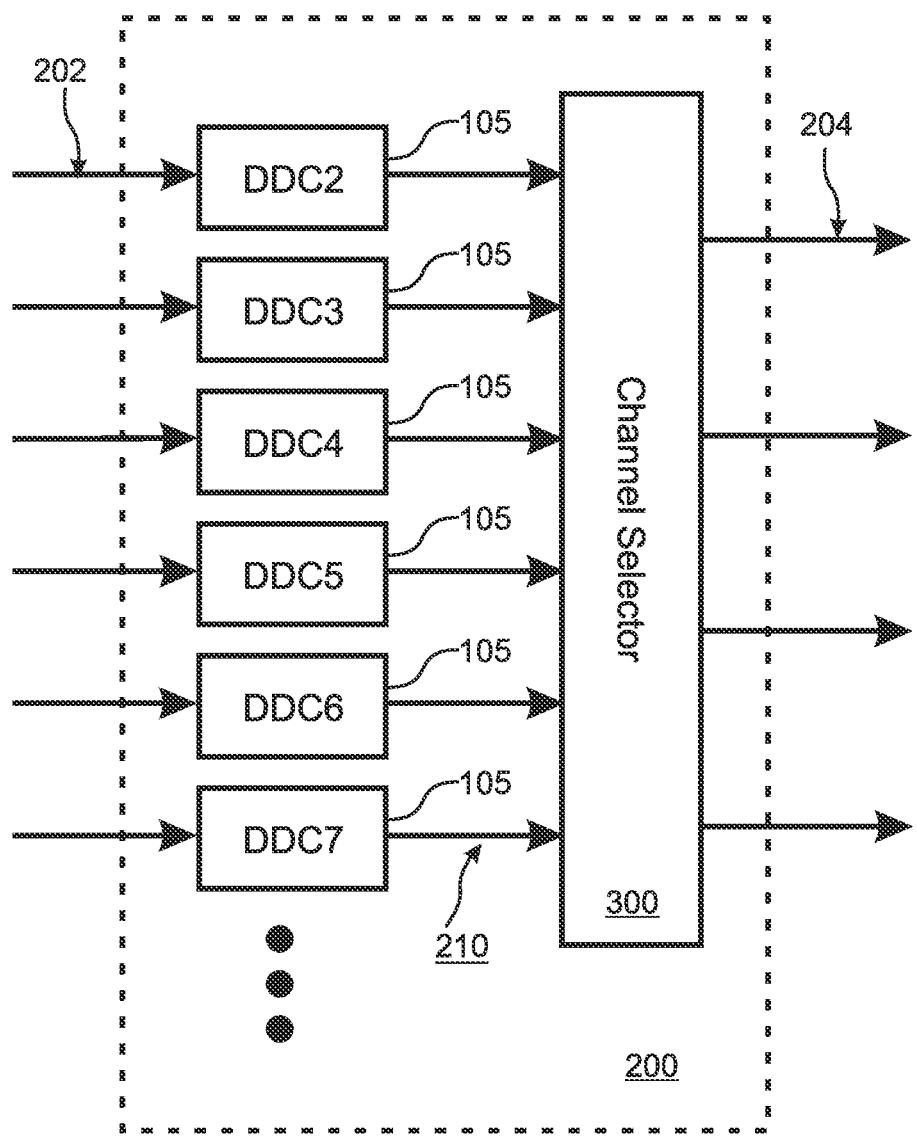
FIG. 3 is a block diagram that illustrates a reference generator according to an embodiment of the present disclosure.

With reference to FIG. 2 and FIG. 3, there is an analog RF front end 103 that may include an antenna or multiple antenna elements along with one or more filters to remove noise, and low noise amplifiers to boost the received signal. There may also be mixers to shift or remove the carrier frequency. The received analog signal is then processed via an ADC 104 to produce a digitized received signal 202. A direct digital converter 102 creates an "active" data stream 116 from the digitized received signal 202 by detecting and down converting signal received on the "active" frequency channel, i.e. the channel that carries the signal of interest (SOI). In addition, the present system and method also includes creating at least one "monitored" data stream 210 that does not contain the SOI by detecting and down converting one or more additional signals, referred to herein as "monitored" signals 210, that are included in the digitized received signal 202. The result is a plurality of data streams 116, 204 that are derived from the received and digitized wireless signal 202, the data streams being derived from a signal detected on a respective one of the CTMC frequency channels.

In embodiments, some or all of the monitored data streams 210 are selected by a channel selector 300 in the reference generator 200 to be "reference" data streams 204. Initially, the reference data streams can be selected according to their signal strength or signal to noise-plus-interference ratios. Subsequently, in embodiments the selection of the reference data streams can be varied to optimize the success of the interference mitigation.

The reference data streams 204 and the jamming pattern data that is recorded in these reference data streams 204 are forwarded to the weight generator 106, where the reference data streams 204 in combination with the down-converted data stream 116 from the active frequency channel are used to generate "reference" adaptive filter weights 108 that are provided to the scrubber 110. In some embodiments, each of the reference data streams 204 is used by the weight generator 106 to create a single virtual antenna tap of the adaptive digital filter 100.

In the illustrated embodiment, the reference data streams 204 from the reference channels F2, F3, F4 as well as the active data stream 116 from the active channel F1 are directed to a delay and alignment module 206 that corrects for any phase misalignment or other misalignments between the reference and active channel data. The delay and alignment module 206 also adds delays to the corrected active and reference channel data 208 so as to compensate for calculation delays in the weight generator 106, so that the corrected active and reference channel data 208 reaches the scrubber 110 at substantially the same time as the adaptive filter weights 108 that are generated by the weight generator 106.

The scrubber 110 processes the corrected active and reference channel data 208 using the reference adaptive filter weights 108 to generate the output signal 112. Essentially, the scrubber 110 uses the adaptive filter weights 108 to generate an "intermediate" signal that is maximally correlated with the interference while being minimally correlated with the signal of interest, and then subtracts the intermediate signal from the corrected active and reference channel data 208, so that the resulting, filtered output signal 112 is a close approximation to the signal of interest in which the interference energy is significantly suppressed relative to the SOI energy.

The filtered output 112 is fed back 114 to the weight generator 106 to provide filtering feedback, so that the weights 108 can be iteratively adjusted until they converge on an "optimal" solution that in this example is coverage. The adaptive filter 100 thereby uses filtering feedback 114 in the form of an error signal to refine its weights 108, and thereby its transfer function. In general, this adaptive process involves the use of a "cost" function that is a criterion for improving the efficiency of the filter, to satisfy an algorithm. Also, the cost function determines how to adapt the filter transfer function to reduce the cost on the next iteration. The mean square of the of the error portion of the filtered signal 112 is often used as the cost function. The weights 108 of the adaptive filter 100 are adjusted by the weight generator 106 until the error, i.e. the cost, is minimized. Accordingly, there are at least two input signals 114, 116 to the weight generator 106 that are referred to herein as the primary 116 and the filtering feedback 114 input, respectively.

FIG. 3 illustrates the structure and function of a reference generator 200 in an embodiment. As shown in FIG. 3, each digitized wireless signal 202 is directed to a digital downconverter 105 and then to a channel selector 300 that selects an optimal set of reference channels 204 from among the monitored channels 210. Initially, the reference channels 204 can be selected according to their signal strength or signal to noise-plus-interference ratios. Subsequently, in embodiments the selection of the reference channels 204 can be varied to optimize the success of the interference mitigation.

Figure 4:
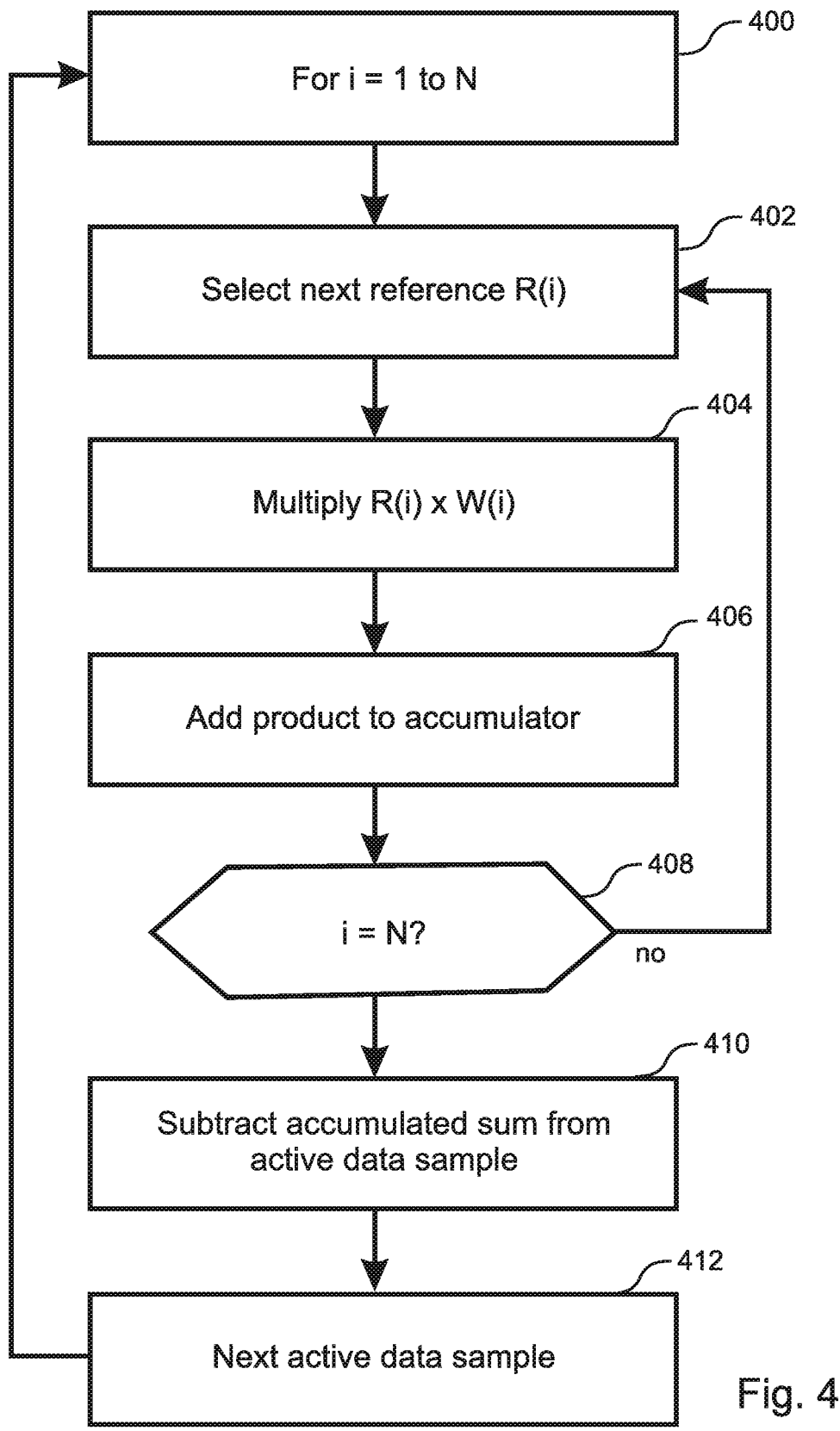
FIG. 4 is a flow diagram that illustrates a method embodiment of the present disclosure.

FIG. 4 is a flow diagram that illustrates functionality of the scrubber in an embodiment of the present disclosure. If for example N monitored channels 210 are selected as reference channels 204, then for each 400 of the N reference channels 204 the scrubber 110 retrieves the reference data from the reference channel 402 and multiplies the reference data by the corresponding reference adaptive filter weight 404. The reference data and corresponding adaptive filter weights can be obtained for example from fast shift registers. The result is then added to an accumulator 406, and the process is repeated 408 for all of the reference channels. The scrubber 110 then subtracts the result 410 stored in the accumulator from the current active channel data sample, thereby enhancing the suppression of the jamming signal in favor of the SOI. The process repeats 412 for the data samples that are included in the down-converted data stream 116 acquired from the active frequency channel.

The presently disclosed method thereby takes advantage of correlations between the jamming signal patterns that are transmitted in the monitored CTMC frequency channels, i.e. the CTMC channels in which the SOI is not present, to provide additional data to the weight generator 106 of the adaptive digital filter, and thereby to increase the suppression of the jamming signal and improve the quality of the filtered output in the output data stream.

It should be noted that the term "monitored" frequency channel is used herein to refer to any CTMC frequency channel that is detected and digitized, in which a jamming signal is present, but the SOI that is being mitigated is not present, at least during the time that jamming pattern data is acquired therefrom. "Selected" or "reference" CTMC channels refers to monitored channels that are selected and provided to the weight generator as reference data, where the reference CTMC channels can be all or a subset of the monitored CTMC channels. The "active" CTMC channel at any given time is the CTMC channel in which the SOI that is being mitigated is present, in addition to a jamming signal. The active CTMC channel is always directed to the weight generator.

In embodiments, the monitored CTMC channels are centered about the active CTMC channel. In some embodiments, the data from each selected CTMC channel provides a single "virtual antenna" tap to the adaptive digital filter, while in other embodiments the data from at least one of the selected CTMC channels provides a plurality of virtual antenna taps to the adaptive filter, for example when multipath echoes are present in the data.

In embodiments, as shown in FIG. 3, the disclosed receiver further includes a channel selector 300 that selects a subset of "reference" channels from among the monitored channels. The selection can be varied until an optimal set of reference channels is identified.

In some embodiments where the signal of interest (SOI) is transmitted as a frequency hopping spread spectrum (FHSS) transmission, the method of the present disclosure is implemented as described above, except that the designation of the "active" frequency channel is reassigned among the frequency channels so that it "hops" together with the SOI. In some of these embodiments, after at least one or more of the FHSS channel hops, the channel that was previously active becomes one of the monitored channels.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

I claim:

1. An apparatus configured for mitigating common template multi-channel ("CTMC") interference in a received wireless signal, the CTMC interference including a plurality of correlated interference patterns broadcast on a plurality of CTMC frequency channels, a first of said CTMC frequency channels being an active CTMC frequency channel in which a signal of interest ("SOI") is also broadcast, the others of said CTMC frequency channels being characterized by an absence of the SOI, the apparatus comprising:
an analog-to-digital converter ("ADC") configured to create a digital input data stream from the received wireless signal;
at least two digital down converters ("DDC"), each of the DDCs being configured to provide a down-converted data stream derived from a signal detected on a respective one of the CTMC frequency channels, said down-converted data streams comprising an active data stream in which the SOI is present and at least one monitored data stream in which the SOI is not present;
a reference generator configured to select at least one reference data stream from the at least one monitored data stream;
a scrubber; and
a weight generator configured to generate an optimized set of adaptive filter weights according to the active data stream and the at least one reference data stream, and according to filtering feedback provided by the scrubber;
said scrubber being configured to apply digital filtering to the active data stream according to the optimized set of adaptive filter weights so as to produce an output stream, and to direct updated filtering feedback to the weight generator.

2. The apparatus of claim 1, wherein the monitored CTMC channels are centered about the active CTMC frequency channel.

3. The apparatus of claim 1, wherein the weight generator is configured to use the at least one reference data stream to create a corresponding single virtual antenna tap.

4. The apparatus of claim 1, wherein the weight generator is configured to use the at least one reference data stream to create a plurality of virtual antenna taps.

5. The apparatus of claim 1, wherein the reference generator is configured to vary the selection of the at least one reference data stream until an optimal set of reference data streams is identified.

6. The apparatus of claim 1, wherein the weight generator is configured to include a set of reference filter weights as part of the set of adaptive filter weights, and wherein the scrubber is configured, when applying the digital filtering to the active data stream, to multiply the at least one reference data stream by at least one corresponding reference filter weight to produce a reference product, accumulate a sum of the reference products, and subtract the sum of reference products from the active data stream.

7. A computer program product including one or more non-transitory machine-readable mediums having instructions encoded thereon that, when executed by one or more processors, cause a process to be carried out for mitigating common template multi-channel ("CTMC") interference in a received wireless signal, the CTMC interference including a plurality of correlated interference patterns broadcast on a plurality of CTMC frequency channels, a first of said CTMC frequency channels being an active CTMC frequency channel in which a signal of interest ("SOI") is also broadcast, the other of said CTMC frequency channels being characterized by an absence of the SOI, the process comprising:
creating a plurality of data streams from the received wireless signal, the data streams being derived from signal detected on a respective one of the CTMC frequency channels, said data streams comprising an active data stream in which the SOI is present and at least one monitored data stream in which the SOI is not present;
selecting at least one reference data stream from the at least one monitored data stream;
generating an optimized set of adaptive filter weights according to the active data stream and the at least one reference data stream, and according to a filtering feedback;
applying digital filtering to the active data stream according to the optimized set of adaptive filter weights so as to produce an output stream; and
providing the output stream as the filtering feedback.

8. The computer program product of claim 7, wherein the monitored CTMC channels are centered about the active CTMC frequency channel.

9. The computer program product of claim 7, wherein generating the optimized set of adaptive filter weights comprises using the at least one reference data stream to create a single virtual antenna tap.

10. The computer program product of claim 7, wherein generating the optimized set of adaptive filter weights comprises using the at least one reference data stream to create a plurality of virtual antenna taps.

11. The computer program product of claim 7, wherein selecting at least one reference data stream from the at least one monitored data stream includes varying the selection of the at least one reference data stream until an optimal set of reference data streams is identified.

12. The computer program product of claim 7, wherein generating the optimized set of adaptive filter weights includes generating a set of reference filter weights, and wherein applying digital filtering to the active data stream includes multiplying the at least one reference data stream by at least one corresponding reference filter weight to produce a reference product, accumulating a sum of the reference products, and subtracting the sum of the reference products from the active data stream.

13. A method of mitigating common template multi-channel ("CTMC") interference in a received wireless signal, the CTMC interference including a plurality of correlated interference patterns broadcast on a plurality of CTMC frequency channels, a first of said CTMC frequency channels being an active CTMC frequency channel in which a signal of interest ("SOI") is also broadcast, the other of said CTMC frequency channels being characterized by an absence of the SOI, the method comprising:
creating from the received wireless signal a plurality of data streams, each of the data streams being derived from a signal detected on a respective one of the CTMC frequency channels, said data streams comprising an active data stream in which the SOI is present and at least one monitored data stream in which the SOI is not present;
selecting at least one reference data stream from the at least one monitored data stream;
directing the active data stream and the at least one reference data stream to a weight generator;
causing the weight generator to generate an optimized set of adaptive filter weights according to the active data stream and the at least one reference data stream, and according to filtering feedback provided by a scrubber;
causing the scrubber to produce an output stream by applying digital filtering to the active data stream according to the optimized set of adaptive filter weights; and
causing the scrubber to direct updated filtering feedback to the weight generator.

14. The method of claim 13, wherein the correlated interference patterns are substantially identical to each other.

15. The method of claim 13, wherein the monitored CTMC channels are centered about the active CTMC frequency channel.

16. The method of claim 13, wherein the at least one reference data stream is used by the weight generator to create a single virtual antenna tap.

17. The method of claim 13, wherein the at least one reference data stream is used by the weight generator to create a plurality of virtual antenna taps.

18. The method of claim 13, wherein selecting at least one reference data stream from the at least one monitored data stream includes varying the selection of the at least one reference data stream until an optimal set of reference data streams is identified.

19. The method of claim 13, wherein the set of adaptive filter weights includes a set of reference filter weights, and wherein applying the digital filtering to the active data stream includes multiplying the at least one reference data stream by at least one corresponding reference filter weight to produce a reference product stream, accumulating a sum of the reference product streams, and subtracting the sum of reference product streams from the active data stream.

20. The method of claim 13, wherein the SOI is transmitted as a frequency hopping spread spectrum ("FHSS") transmission, and wherein the method includes reassigning the active frequency channel among the CTMC frequency channels so that the active CTMC frequency channel always contains the SOT.

21. The method of claim 20, wherein reassigning the active frequency from a first of the CTMC frequency channels to a second of the CTMC frequency channels includes designating the first of the CTMC frequency channels as one of the monitored CTMC frequency channels.

22. The method of claim 20, wherein reassigning the active frequency from a first of the CTMC frequency channels to a second of the CTMC frequency channels includes designating the first of the CTMC frequency channels as one of the reference CTMC frequency channels.

* * * * *